United States Patent [19]

Skraba

[11] Patent Number: 4,776,948
[45] Date of Patent: Oct. 11, 1988

[54] FRACTIONATION METHOD WITH QUENCH LIQUID RECYCLE

[75] Inventor: Frank W. Skraba, Sweeny, Tex.

[73] Assignee: Williams, Phillips & Umphlett, Bartlesville, Okla.

[21] Appl. No.: 575,112

[22] Filed: Jan. 30, 1984

[51] Int. Cl.⁴ .............................................. C10G 11/00
[52] U.S. Cl. .................................. 208/355; 208/100; 208/104; 208/358; 203/90
[58] Field of Search ............... 208/350, 348, 355, 358, 208/100, 104, 78; 203/90

[56] References Cited

U.S. PATENT DOCUMENTS

| | | | |
|---|---|---|---|
| 2,221,702 | 11/1940 | Eaton | 208/358 |
| 2,786,802 | 3/1959 | Hanisian et al. | 208/355 |
| 2,889,265 | 6/1959 | Borey et al. | 208/100 |
| 2,950,241 | 8/1960 | Craft et al. | 208/100 |
| 3,094,482 | 6/1963 | Vineyard | 208/308 |
| 3,133,014 | 5/1964 | Cross, Jr. | 208/348 |
| 3,136,706 | 6/1964 | Harper | 202/40 |
| 3,383,308 | 5/1968 | Wickham et al. | 208/358 |
| 3,591,485 | 7/1971 | Mason, Jr. | 208/78 |
| 3,617,536 | 11/1971 | Saylor | 208/355 |
| 4,213,856 | 7/1980 | Blake et al. | 209/250 |

OTHER PUBLICATIONS

"Heavy Oil Cracking (HOC)", *Hydrocarbon Processing*, Sep. 1982, p. 159.

*Primary Examiner*—Helen M. S. Sneed
*Assistant Examiner*—Glenn Caldarola
*Attorney, Agent, or Firm*—Paul S. Chirgott

[57] ABSTRACT

Method and apparatus for fractionating a hot vaporous hydrocarbon feed from a fluid catalytic cracking reactor wherein the hot vaporous feed is introduced into a fractionator zone near one end thereof and liquid is removed from a liquid collection zone and cooled in a heat extraction zone. A first portion of the cooled liquid is returned to a location between the liquid collection zone and the point of introduction of the vaporous feed and sprayed directly on hot condensed liquid flowing downwardly over an inclined baffle plate to quickly quench the liquid below the temperature at which polymerization of the constituents of the liquid can occur.

8 Claims, 3 Drawing Sheets

FRACTIONATION METHOD WITH QUENCH LIQUID RECYCLE

The present invention relates generally to the refining of petroleum feedstocks. In one aspect the invention relates to fractionation of vaporous feed comprising petroleum constituents. In another aspect the invention relates to apparatus for fractionating a vaporous feed comprising petroleum constituents.

In the fractionation of a hot vaporous effluent stream from the reactor of a fluid catalytic cracking (FCC) reactor it is desirable to recycle or reflux at least a portion of the oil which collects in the bottom of the fractionator back to the upper portion of the fractionator via a suitable heat exchanger to cool the oil prior to its reintroduction into the fractionator. This technique is commonly referred to as slurry oil pumparound. The oil moving downwardly through the upper portion of the fractionator is highly heated due to contact with the hot vaporous effluent from the FCC reactor, which effluent is typically at a temperature generally in the range from about 850° F. (454° C.) to about 980° F. (527° C.). It has been found, however, that such heat exchangers in the slurry oil pumparound loop are subject to intermittent fouling in such service, which fouling causes undersirable reductions in FCC unit operating capacity. Usage of expensive, commercially available antifoulant additives has proved only marginally effective in reducing such fouling and totally ineffective in eliminating such fouling.

It would, therefore, be highly desirable to eliminate the problem of heat exchanger fouling in the slurry oil pumparound loop of an FCC unit fractionator. The elimination of this problem would increase the operating capacity of such FCC unit, reduce unit downtime for cleaning fouled heat exchangers and reduce costs of operation through both increased unit operating efficiency and elimination of usage of expensive antifoulants.

I have discovered that by quickly quenching the downwardly flowing oil in the fractionator to a temperature below that at which the oil will polymerize and/or form coke or coke precursors, and by increasing the residence time of the thus quenched oil in the bottom portion of the fractionator prior to withdrawing a stream of such oil for recycle or reflux pumparound through the heat exchanger or cooler of the pumparound loop back to the fractionator function to completely overcome the intermittent fouling of the slurry oil pumparound heat exchanger.

In accordance with one aspect of the invention, a method of fractionating a hot vapor containing feed is provided. The method generally comprises introducing a hot vapor containing feed into a fractionation zone at a vapor containing feed location near one end of the fractionation zone; removing liquid from a liquid collection zone below the one end of the fractionation zone; passing the thus removed liquid through a heat extraction zone to extract heat from the liquid to produce cooled liquid; returning a first portion of the thus cooled liquid to the fractionation zone as a first reflux liquid at a location intermediate the vapor containing feed location and the other end of the fractionation zone; and returning a second portion of the thus cooled liquid to the fractionation zone as a quench liquid at a location intermediate the vapor containing feed location and the surface of the liquid in the liquid collection zone to directly cool condensed liquid from the hot vapor containing feed passing from the fractionation zone and the vapor containing feed location to the surface of the liquid in the liquid collection zone.

In accordance with another aspect of the invention, apparatus suitable for use in the fractionation of a hot vaporous feed stream is provided. The apparatus generally comprises a vessel having an upper portion, a lower portion and a medial portion; fractionation tray means in the medial portion of the vessel for separating fractions of a hot vaporous feed stream; baffle means in the medial portion of the vessel intermediate the fractionation tray means and the lower portion of the vessel for directing the flow of liquid thereover; inclined baffle plate means having an upper surface and a lower surface disposed in the vessel below the lowermost portion of the baffle means for directing the flow of liquid thereover; vertical passage means in the vessel communicating with the lower portion of the upper surface of the inclined baffle plate means for directing the flow of liquid downwardly from the inclined baffle plate means; first conduit means communicating with the interior of the vessel intermediate the baffle means and the inclined baffle plate means for introducing a hot vaporous feed stream into the vessel for fractionation thereof; second conduit means communicating with the interior of the vessel below the inclined baffle plate means for withdrawing liquid from a body of liquid in the lower portion of the vessel; cooler means interposed in the second conduit means for cooling withdrawn liquid passing through the second conduit means; and third conduit means communicating between the second conduit means downstream of the cooler means and the interior of the vessel intermediate the first conduit means and the upper surface of the inclined baffle plate means for dispensing cooled liquid from the cooler means onto the upper surface of the inclined baffle plate means to cool hot liquid flowing downwardly over the upper surface of the inclined baffle plate means into the body of liquid in the lower portion of the vessel.

An object of the invention is to increase the efficiency of refining of petroleum feedstocks.

Another object of the invention is to provide a method of fractionating a petroleum feedstock which is economical and efficient.

A further object of the invention is to provide economical and efficient apparatus for fractionating a petroleum feedstock.

A still further object of the invention is to reduce the occurrence of intermittent heat exchanger fouling in the slurry oil pumparound loop of a fractionator in an FCC unit.

Still another object of the invention is to provide fluid catalytic cracking apparatus which is economical in construction, operation and maintenance.

Other objects, aspects and advantages of the invention will be evident from the following detailed description and appended claims when read in conjunction with the accompanying drawings.

Figure 1:
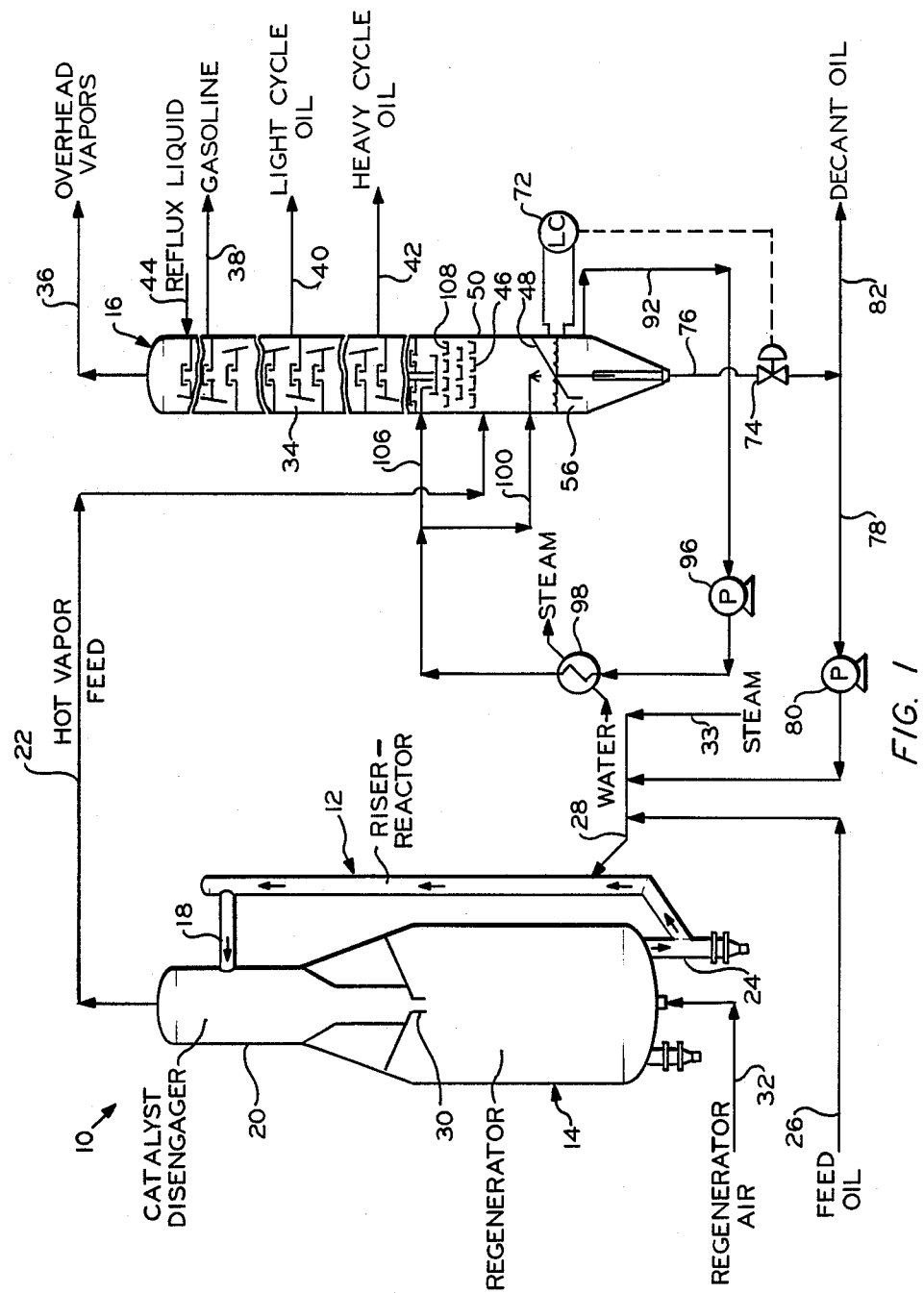
FIG. 1 is a schematic flow diagram of a fluid catalytic cracking unit in accordance with the invention.

Referring now to the drawings, and in particular to the schematic flow diagram of FIG. 1, a fluid catalytic cracking unit is illustrated and is generally designated by the reference character 10. The unit 10 comprises a fluidized type catalytic riser-reactor 12, a catalyst regenerator 14 and a fractionator 16. The catalytic riser-reactor 12 is connected in fluid flow communication with the fractionator 16 by means of a conduit 18, a catalyst disengager 20 and a hot vapor transfer line or conduit 22. Various valves, pressure gauges and controls often present in such reactor systems have been omitted as not essential to the invention but can be utilized in manners and for purposes well known to those skilled in the art. Such reactor systems are shown in U.S. Pat. No. 3,133,014 issued to Cross and U.S. Pat. No. 3,338,821 issued to Moyer et al.

Hot regenerated catalyst from the catalyst regenerator 14 ccan be passed to the riser-reactor 12 by means of a downcomer line 24. A feed oil, such as, for example, a gas oil and/or topped crude, is introduced to the reactor 12 via conduit 26 and manifold 28. Spent catalyst from the reactor 12, which has been steam-stripped in the catalyst disengager 20, can be continuously withdrawn from the catalyst disengager 20 and passed to the regenerator 14 via downcomer line 30. Regenerator air is introduced into the regenerator via conduit 32. Steam is introduced into the reactor 12 via conduit 33 and manifold 28.

The catalyst is generally in the form of finely divided particles, or powder, which assumes a fluidized or steam-ebulliated condition within the riser-reactor 12. Suitable cracking catalysts, which can be used in the practice of the present invention, include acid activated bentonite clays, and synthetic composite gel catalyst systems such as silica-alumina, silica-magnesia, the molecular sieve types such as zeolites, and the like. The catalyst particles can range in size from about 100 to 400 mesh. A major portion of the particles can range between 20 and 80 microns in diameter. Particles of this size are easily fluidized in and conveyed upwardly through the riser-reactor 12 and are easily conveyed through the catalyst disengager 20 through the catalyst regenerator 14 and associated equipment.

The reactor 12 can be any suitable type well known in the art. It is generally preferred to connect the conduit 22 to the reactor 12 by means of the catalyst disengager 20 having an interiorly disposed cyclone separator (not shown) which will remove almost all the entrained catalyst from the hot hydrocarbon vapors before they enter conduit 22. However, some catalyst usually remains entrained in the hot vaporous feed stream in the conduit 22 and goes over into the lower portion of the fractionator 16 near the lower end of the fractionation zone 34 within the fractionator 16 where the entrained catalyst forms a slurry in the liquids in the lower portion of the fractionator 16.

The fractionator 16 can be provided with the usual plurality of conventional fractionation trays in the fractionation zone 34, which trays may be of the bubble-cap, sieve, plate or other known types. Such trays serve to separate the converted hydrocarbons into different molecular weight fractions as they condense and/or evaporate in the fractionation zone of the fractionator 16. Light overhead gases pass overhead from the fractionator 16 through conduit 36 while gasoline passes from the upper portion of the fractionation zone 34 via conduit 38. Light cycle oil is remoed from the fractionation zone via conduit 40 and heavy cycle oil is removed from the fractionation zone via conduit 42. Separation can be controlled by introducing a refluxing liquid into the fractionation zone near the top of the fractionator 16 via conduit 44. Condensed liquids from the fractionation zone 34 fall from the lowermost trays or baffle plates 46 of the fractionation zone, such as shed deck trays, onto an inclined baffle plate 48 disposed within the vessel 50 of the fractionator 16 below the lowermost portion of the baffle plates 46 of the fractionation zone 34.

Figure 2:
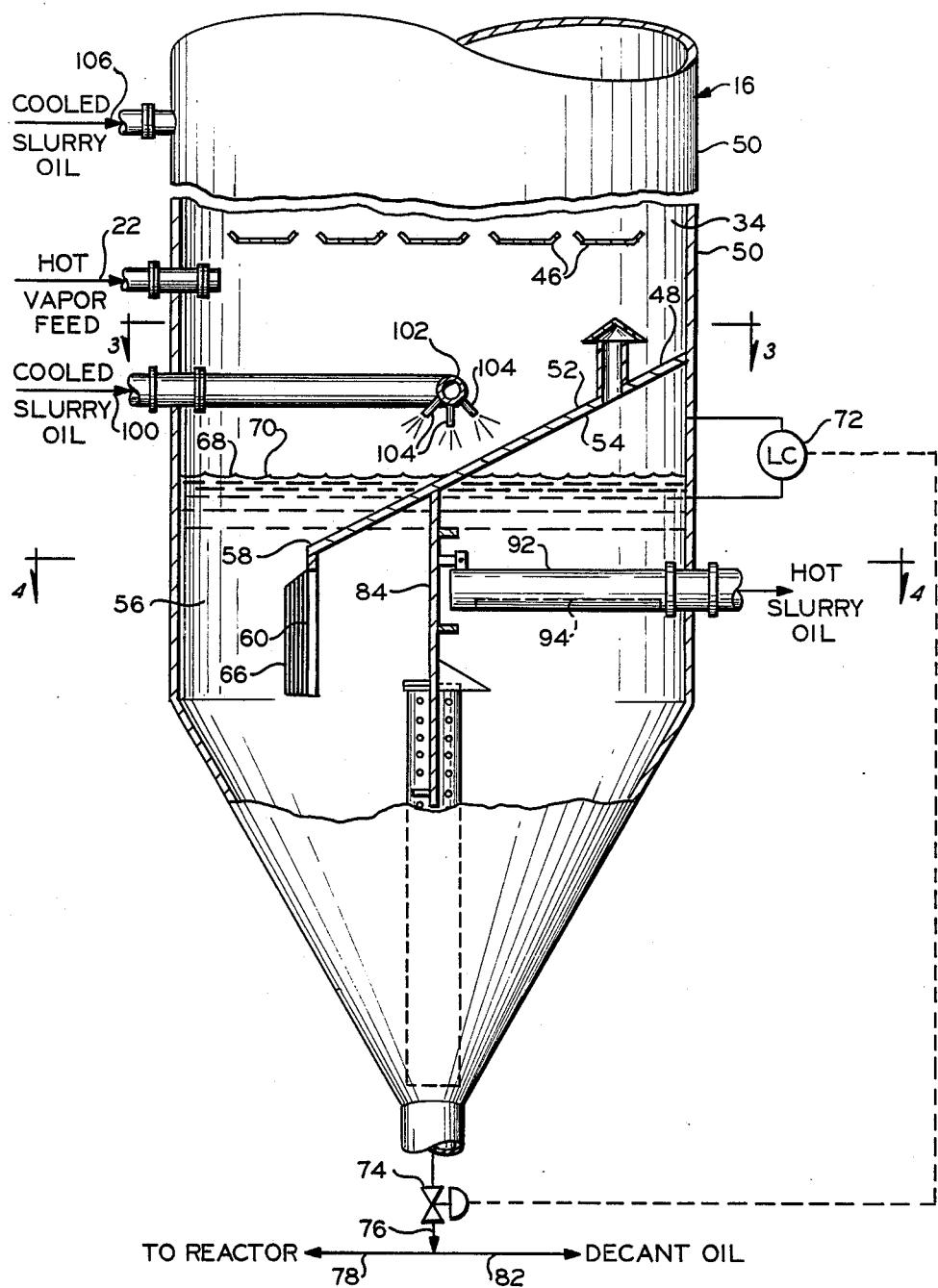
FIG. 2 is an enlarged side elevational view of the lower portion of the fractionator of FIG. 1 with portions thereof broken away to more clearly illustrate internal construction details.
Figure 3:
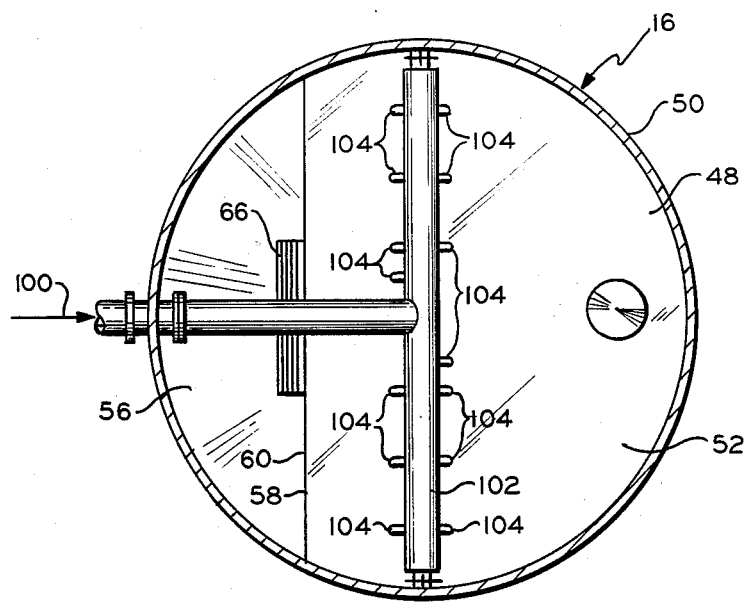
FIG. 3 is a horizontal cross section taken along line 3—3 of FIG. 2.
Figure 4:
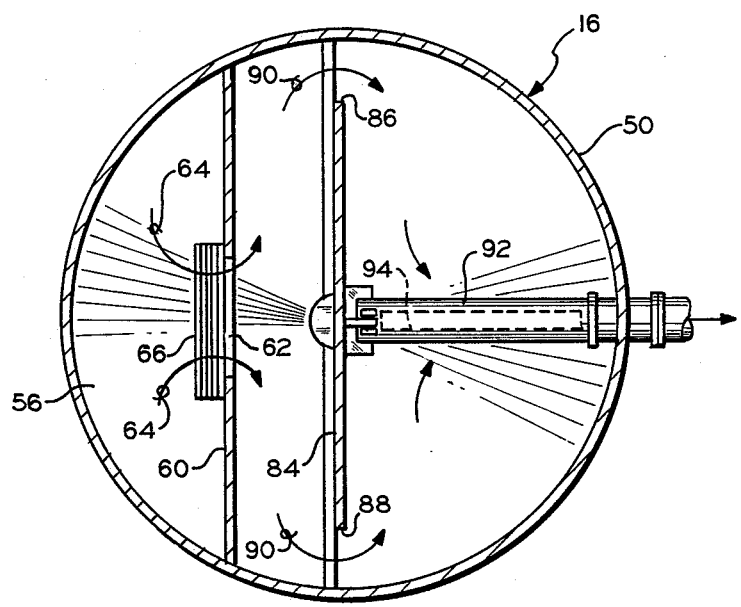
FIG. 4 is a horizontal cross section taken along line 4—4 of FIG. 2.

With further reference to FIGS. 2–4, the inclined baffle plate 48 has an upper surface 52 and a lower surface 54. The inclined baffle plate is inclined at any suitable angle to the horizontal, generally at an angle in the range from about 20° to about 30°, and preferably at an angle of about 25°. The inclined baffle plate 48 provides means for directing a flow of liquid falling thereon from above to a vertical passage 56 within the vessel 50 which communicates with the lower portion 58 of the upper surface 52 of the inclined baffle plate 48 for directing the flow of liquid downwardly from the inclined baffle plate 48 within the vessel 50. The vertical passage 56 is partially defined by a first generally vertical baffle 60 which extends downwardly from the lower portion 58 of the inclined baffle plate 48 for a substantial distance. The first generally vertical baffle 60 communicates at each end thereof with the inner surface of the vessel 50. The medial portion of the first generally vertical baffle 60 is provided with an open passage 62 to permit the flow of liquid therethrough in a horizontal direction from the vertical passage 56 as shown by the arrows 64 in FIG. 4. The passage 62 may be provided with a suitable grating 66 for controlling the flow characteristics of the liquid through the passage 62. The liquid referred to is the slurry oil comprising condensed hydrocarbon liquids and entrained catalyst particles which fall by gravity to a body of liquid 68 in the liquid collection zone in the lower portion of the vessel 50. The surface level 70 of the body of liquid 68 is maintained by a suitable liquid level controller 72 of conventional design which controls a suitable valve 74 interposed in a conduit 76 which communicates with the lowermost portion of the vessel 50 and provides means for withdrawing slurry oil from the bottom of the vessel 50. Slurry oil from conduit 76 can be returned to the reactor 12 via conduit 78, pump 80 interposed therein, manifold 28, riser line 22 and conduit 24. Slurry oil from conduit 76 can also be directed to suitable settler means for decanting the oil (not shown) via conduit 82.

A second generally vertical baffle 84 extends downwardly from the lower surface 54 of the inclined baffle plate 48 substantially parallel to the first generally vertical baffle 60. The second generally vertical baffle 84 extends substantially across the medial portion of the vessel 50 and provides a pair of passages 86 and 88 at the opposite ends thereof between the baffle 84 and the inner surface of the vessel wall 50 to permit the flow of liquid through the passages 86 and 88 as illustrated by the arrows 90 in FIG. 4.

A take-off pipe 92 is disposed within the vessel 50 below the inclined baffle plate 48 to the side of the second generally vertical baffle 84 opposite the first generally vertical baffle 60. The pipe 92 is provided with a longitudinal opening 94 along the lower portion thereof through which liquid near the upper surface of the body of liquid 68 can be withdrawn and passed through the wall of the vessel 50 via a pump 96 and a heat extraction zone in the form of a cooler 98 interposed in the conduit 92. The conduit 92 communicates with a conduit 100 downstream of cooler 98, and the conduit 100 communicates with the interior of the vessel 50 intermediate the conduit 18 carrying the hot vapor containing feed from the reactor 12 and the upper surface 52 of the inclined baffle plate 48. The conduit 100 preferably terminates within the vessel 50 with a suitable sparger or spray pipe 102 which extends substantially over the full width of the inclined baffle plate 48 and is provided with a plurality of generally downwardly directed spray nozzles 104 which direct slurry oil which has been cooled by the cooler 98 toward the upper surface 52 of the inclined baffle plate 48 and the upper surface 70 of the body of liquid 68 in the vessel 50. The pipe or conduit 92 also communicates downstream of the cooler 98 with a conduit 106 which provides means for introducing cooled slurry oil from the cooler into the interior of the vessel 50 between the fractionation trays of the fractionation zone 34 and the uppermost baffle trays 108. The cooler 98 is preferably an indirect heat exchanger which functions as a steam generator while cooling the slurry oil in the slurry oil pumparound loop comprising line or conduit 92, pump 96, cooler 98, conduit 100 and conduit 106.

In typical operation of the fractionator 16 of the FCC unit 10, hot vapor containing feed is introduced via conduit 22 into the vessel 50 at a suitable temperature, generally in the range from about 850° F. (554° C.) to about 980° F. (527° C.) where the feed is fractionated in the fractionation zone 34 and separated into the various constituents as described above. The liquid portion of the feed which is condensed in the fractionation zone 34 passes downwardly from the fractionation zone over the baffle trays located intermediate the fractionation trays of the fractionation zone 34 and the inlet of the conduit 22 at a temperature generally in the range from about 725° F. (385° C.) to about 850° F. (454° C.). This condensed liquid falls upon the upper surface 52 of the inclined baffle plate 48 flowing downwardly thereacross under the influence of gravity toward the vertical passage 56 and the surface 70 of the body of liquid 68. Cooled reflux liquid from the slurry oil pumparound loop is sprayed upon the liquid as it flows over the upper surface of the inclined baffle plate as well as upon the surface 70 of the body of liquid 68 so as to quench the condensed liquid quickly below a temperature at which polymerization of the liquid as well as formation of coke and coke precursors occurs. Additional quenching is obtained from the cooled pumparound slurry oil which is introduced via conduit 106 above the uppermost baffle trays 108.

Further cooling of the liquid as well as settling of catalyst and coke particles entrained therein is achieved by maximizing the residence time of such liquid in the body of liquid 68 by subjecting the upper portion of the liquid to a tortuous path through baffle means comprising the first generally vertical baffle 60 and the second generally vertical baffle 84 as the liquid in the upper portion of the body of liquid moves from the vertical passage 56 to the opening 94 in the take-off pipe 92. The level controller 72 acting in conjunction with the control valve 74 functions to maintain the surface level 70 of the body of liquid 68 above the lower portion 58 of the inclined baffle plate 48, and preferably at a level intersecting the upper surface 52 of the inclined baffle plate 48 along a line approximately intersecting the vertical center line of the vessel 50 of the fractionator 16. It is presently preferred to operate the slurry oil pumparound loop in a manner such that the cooler 98 reduces the temperature of the slurry oil passing therethrough to a temperature generally in the range from about 400° F. (204° C.) to about 500° F. (260° C.).

It will be understood that, while the vertical baffle means disposed beneath the surface 70 of the body of liquid 68 comprises the first and second generally vertical baffles 60 and 84, any number of generally vertical baffles can be employed in order to achieve the desired residence time of the liquid in the lower portion of the vessel 50. It is of primary importance in the present invention that the desired degree of quenching of the hot condensed liquids be achieved in the shortest amount of time possible and that the slurry oil being withdrawn from the body of liquid 68 be subjected to the maximum residence time in the vessel 50 to thereby substantially eliminate the formation of polymeric particles, coke and coke precursors within the fractionator 16 and prevent the entrance of such particles as well as catalyst particles into the slurry oil pumparound loop so as to prevent fouling of the cooler 98.

From the foregoing it will be seen that the method and apparatus of the present invention provides simple and economical means for overcoming fouling of the slurry oil pumparound cooler. Changes may be made in the combination and arrangement of parts or elements as heretofore set forth in the specification and shown in the drawings without departing from the spirit and scope of the invention as defined in and limited only by the following claims.

I claim:

1. In a method of fractionating a hot vapor containing feed, the steps comprising:
    (a) introducing a hot vapor containing feed into a fractionation zone at a vapor containing feed location near one end of said fractionation zone;
    (b) removing liquid from a liquid collection zone below said one end of said fractionation zone;
    (c) passing said thus removed liquid through a heat extraction zone to extract heat from said liquid to produce cooled liquid;
    (d) returning a first portion of said thus cooled liquid to said fractionation zone as a first reflux liquid at a location intermediate the vapor containing feed location and the other end of said fractionation zone; and
    (e) returning a second portion of said thus cooled liquid to said fractionation zone as a quench liquid at a location intermediate the vapor containing feed location and the surface of the liquid in said liquid collection zone wherein said quench liquid is sprayed onto an inclined surface over which condensed liquid from said hot vapor containing feed passes from said fractionation zone and said vapor containing feed location to the surface of the liquid in said liquid collection zone to directly cool said condensed liquid.

2. A method in accordance with claim 1 wherein step (e) further includes spraying the quench liquid onto at least a portion of the surface of the liquid in the liquid collection zone.

3. A method in accordance with claim 1 wherein step (e) includes spraying the quench liquid onto an inclined surface over which condensed liquid from said hot vapor containing feed passes from the fractionation zone and the vapor containing feed location to the surface of the liquid in the liquid collection zone; and maintaining the surface of the liquid in the liquid collection zone at a level intersecting the inclined surface.

4. A method in accordance with claim 1 wherein said hot vapor containing feed comprises hydrocarbon effluent from a fluid catalytic cracking reactor.

5. A method in accordance with claim 4 wherein the hot vapor containing feed is introduced into the fractionation zone at a temperature in the range from about 850° F. (454° C.) to about 980° F. (527° C.), the temperature of the liquid passing from the fractionation zone to the inclined surface ranges from about 725° F. (385° C.) to about 850° F. (454° C.), and wherein said liquid in said liquid collection zone is cooled to a maximum temperature of about 675° F. (357° C.).

6. A method in accordance with claim 5 wherein the temperature of the cooled liquid produced in step (c) ranges from about 400° F. (204° C.) to about 500° F. (260° C.).

7. A method in accordance with claim 1 characterized further to include:

introducing a second reflux liquid into said fractionation zone at a location at said other end of said fractionation zone;

flowing the thus introduced second reflux liquid, passing a point in the fractionation zone intermediate the location at which the first portion of cooled liquid is returned and the location at which the second reflux liquid is introduced at the other end of the fractionation zone and passing the location at which the quench liquid is returned, to the surface of the liquid in the liquid collection zone; and wherein said quench liquid additionally directly cools the second reflux liquid passing from the fractionation zone to the surface of the liquid in the liquid collection zone.

8. A method in accordance with claim 1 wherein step (b) is further characterized by removing the liquid from the upper portion of the liquid in the liquid collection zone through a zone of restricted flow below the surface of the liquid in the liquid collection zone.

* * * * *

UNITED STATES PATENT AND TRADEMARK OFFICE
CERTIFICATE OF CORRECTION

PATENT NO. : 4,776,948

DATED : October 11, 1988

INVENTOR(S) : Frank W. Skraba

It is certified that error appears in the above-identified patent and that said Letters Patent is hereby corrected as shown below:

On the title page:

Item [73] Assignee should be changed from "Williams, Phillips & Umphlett" to --- Phillips Petroleum Company ---.

Signed and Sealed this

Twenty-sixth Day of February, 1991

Attest:

HARRY F. MANBECK, JR.

*Attesting Officer*  *Commissioner of Patents and Trademarks*